Patented Mar. 4, 1941 2,233,680

UNITED STATES PATENT OFFICE 2,233,680

PROCESS OF VULCANIZING RUBBER AND PRODUCTS OBTAINED THEREBY

Robert L. Sibley, Nitro, W. Va., assignor to Monsanto Chemical Company, St. Louis, Mo., a corporation of Delaware No Drawing. Original application October 23, 1930, Serial No. 490,814. Divided and this application June 18, 1938, Serial No. 214,575

4 Claims. (Cl. 260—789)

This invention relates to the vulcanization of rubber by an improved process, wherein there is employed a member of a preferred class of compounds which improve the action of the accelerator used in the vulcanization process and with them form a mixed accelerator. The preferred class of compounds employed in the manner hereinafter described comprises salts of a guanidine and derivatives thereof.

As examples showing the use of the preferred class of compounds, a rubber mix was prepared in the well known manner comprising 100 parts of pale crepe rubber, 5 parts of zinc oxide, 3 parts of sulfur, 0.5 part of the crotonaldehyde derivative of the reaction product of mercaptobenzothiazole and hexamethylenetetramine, 0.5 part of diphenylguanidine, and 0.1 and/or 0.2 part of a compound of the preferred class of activators as hereinafter mentioned. The mix was then vulcanized by heating under various pressures and for various periods of time. The cured stock was then tested to determine its modulus and tensile strength under various degrees of elongation. The results of the tests of the rubber composition thus described are set forth in the following tables. Table I gives the results when diphenylguanidine hydrochloride is employed as an example of the preferred class of compounds and Table II gives the results when diphenylguanidine benzoate is so used.

Table I

| Time of cure | Number parts diphenyl-guanidine hydrochloride | Modulus of elasticity in lbs./in.$^2$ at elongations of— | | | Tensile lbs./in.$^2$ at break | Ultimate elongation, percent |
|---|---|---|---|---|---|---|
| | | 300% | 500% | 700% | | |
| 15 min. at 10 lbs. steam per sq. in | None | 85 | 133 | 349 | 1140 | 990 |
| | 0.1 | 84 | 151 | 422 | 1845 | 980 |
| | 0.2 | 94 | 185 | 440 | 1970 | 980 |
| 20 min. at 10 lbs. steam per sq. in | None | 108 | 201 | 556 | 1870 | 930 |
| | 0.1 | 97 | 200 | 675 | 2095 | 910 |
| | 0.2 | 139 | 241 | 740 | 2185 | 910 |
| 30 min. at 10 lbs. steam per sq. in | None | 131 | 300 | 952 | 2465 | 875 |
| | 0.1 | 165 | 312 | 1070 | 2640 | 875 |
| | 0.2 | 157 | 328 | 1090 | 2810 | 880 |
| 1½ hrs. at 20 lbs. steam per sq. in | None | 315 | 963 | 3400 | 4260 | 750 |
| | 0.1 | 356 | 1040 | 3620 | 4320 | 750 |
| | 0.2 | 336 | 1095 | 3850 | 4380 | 745 |

Table II

| Time of cure | Number parts diphenyl-guanidine benzoate | Modulus of elasticity in lbs./in.$^2$ at elongations of— | | | Tensile lbs./in.$^2$ at break | Ultimate elongation, percent |
|---|---|---|---|---|---|---|
| | | 300% | 500% | 700% | | |
| 15 min. at 10 lbs. steam per sq. in | None | 85 | 133 | 349 | 1140 | 990 |
| | 0.1 | 93 | 173 | 440 | 1720 | 980 |
| | 0.2 | 88 | 173 | 433 | 1803 | 970 |
| 20 min. at 10 lbs. steam per sq. in | None | 108 | 201 | 556 | 1870 | 930 |
| | 0.1 | 133 | 227 | 709 | 2040 | 910 |
| | 0.2 | 132 | 236 | 661 | 2210 | 930 |
| 30 min. at 10 lbs. steam per sq. in | None | 131 | 300 | 952 | 2465 | 875 |
| | 0.1 | 140 | 311 | 1183 | 2650 | 865 |
| | 0.2 | 152 | 322 | 1045 | 2665 | 875 |
| 1½ hrs. at 20 lbs. steam per sq. in | None | 315 | 963 | 3400 | 4260 | 750 |
| | 0.1 | 316 | 1000 | 3580 | 4250 | 745 |
| | 0.2 | 326 | 1055 | 3710 | 4200 | 735 |

It is readily apparent from the data set forth in Tables I and II that the preferred class of materials possess highly desirable activation properties.

As examples of the use of the preferred class of compounds, showing retarding effect in the shorter timed and lower steam pressure cures and activation in the longer timed and higher steam pressure cures, the following three rubber stocks, designated "A," "B" and "C" were prepared and tested in the manner hereinbefore set forth.

|  | Stock A | Stock B | Stock C |
|---|---|---|---|
|  | Parts | Parts | Parts |
| Pale crepe rubber | 100 | 100 | 100 |
| Zinc oxide | 8 | 8 | 8 |
| Sulfur | 2.5 | 2.5 | 2.5 |
| Stearic acid | 0.5 | 0.5 | 0.5 |
| Crotonaldehyde derivative of the reaction product of mercaptobenzothiazole and hexamethylenetetramine | 0.4 | 0.4 | 0.4 |
| Diphenylguanidine | 0.6 |  |  |
| Diphenylguanidine phthalate |  | 0.6 |  |
| Diphenylguanidine acetate |  |  | 0.6 |

The results of the tests upon the above described rubber stocks after curing for various periods of time and under various steam pressures are given in Table III, which shows by comparison the desirable effect of the presence of a compound of the preferred class, as for example diphenylguanidine phthalate and diphenylguanidine acetate, on the cure of a rubber stock of vulcanization characteristics.

curing process in the longer timed and higher steam pressure cures, but also greatly retard the cure in the shorter timed and lower steam pressure cures. This retardation of cure at the lower temperatures is a highly desirable property, as scorching or vulcanizing on the mixing rolls is thereby substantially prevented.

As further examples of the use of the preferred class of materials, a rubber mix was prepared comprising 100 parts of pale crepe rubber, 5 parts of zinc oxide, 3 parts of sulfur, 1 part of stearic acid, 0.4 part of the acetaldehyde derivative of the reaction product of para-para-diamino-diphenyl-methane and mercaptobenzothiazole, and 0.6 part of the preferred class of materials. The results of the tests upon the above rubber stock after curing are given in the following tables. Table IV gives the results of tests of the cured rubber product in which diphenylguanidine phthalate was incorporated in the above described rubber stock prior to the vulcanization thereof. Table V gives the results of tests obtained when diphenylguanidine hydrochloride

Table III

| Cure mins. | Steam pressure in lbs./in.$^2$ | Stock | Modulus of elasticity in lbs./in.$^2$ at elongations of— | | | Tensile lbs./in.$^2$ at break | Ultimate elongation, percent |
|---|---|---|---|---|---|---|---|
|  |  |  | 300% | 500% | 700% |  |  |
| 15 | 10 | A | 54 | 98 | 188 | 1195 | 1090 |
|  |  | [1] B |  |  |  |  |  |
|  |  | [1] C |  |  |  |  |  |
| 20 | 10 | A | 98 | 144 | 398 | 1778 | 990 |
|  |  | [1] B |  |  |  |  |  |
|  |  | C | 65 | 103 | 224 | 1085 | 1040 |
| 30 | 10 | A | 117 | 223 | 818 | 2360 | 895 |
|  |  | [1] B |  |  |  |  |  |
|  |  | C | 100 | 189 | 621 | 2135 | 930 |
| 60 | 10 | A | 194 | 440 | 1775 | 3235 | 810 |
|  |  | B | 131 | 225 | 768 | 2235 | 900 |
|  |  | C | 185 | 434 | 1730 | 3565 | 835 |
| 10 | 20 | A | 98 | 182 | 592 | 2120 | 935 |
|  |  | [2] B |  |  |  |  |  |
|  |  | C | 87 | 135 | 387 | 1413 | 950 |
| 20 | 20 | A | 182 | 382 | 1450 | 3040 | 830 |
|  |  | B | 90 | 139 | 334 | 1060 | 920 |
|  |  | C | 168 | 307 | 1158 | 2825 | 860 |
| 30 | 20 | A | 189 | 475 | 1870 | 3395 | 800 |
|  |  | B | 132 | 254 | 910 | 2445 | 870 |
|  |  | C | 176 | 454 | 1850 | 3405 | 815 |
| 45 | 20 | A | 230 | 638 | 2575 | 3895 | 765 |
|  |  | B | 184 | 418 | 1710 | 2820 | 790 |
|  |  | C | 259 | 658 | 2725 | 3770 | 760 |
| 60 | 20 | A | 300 | 685 | 2920 | 3940 | 780 |
|  |  | B | 221 | 587 | 2300 | 3620 | 790 |
|  |  | C | 308 | 840 | 3170 | 4070 | 745 |
| 90 | 20 | A | 315 | 968 | 3920 | 4175 | 710 |
|  |  | B | 285 | 810 | 3260 | 4290 | 755 |
|  |  | C | 318 | 1095 | 4320 | 4420 | 710 |
| 120 | 20 | A | 293 | 900 | 3595 | 4410 | 730 |
|  |  | B | 282 | 750 | 3080 | 3925 | 750 |
|  |  | C | 309 | 990 | 3900 | 4415 | 725 |

[1] Cure insufficient for test.
[2] No test made.

A comparison of the results given in Table III shows that the preferred class of materials as for example diphenylguanidine phthalate and diphenylguanidine acetate, not only activate the curing process in the longer timed and higher steam pressure cures, but also greatly retard the cure in the shorter timed and lower steam pressure cures.

was employed in the manner described above, and Table VI sets forth the results obtained when diphenylguanidine acetate was employed in the above identified stocks in the manner described.

Table IV

| Time of cure | Modulus of elasticity in lbs./in.$^2$ at elongations of— | | | Tensile lbs./in.$^2$ at break | Ultimate elongation, percent |
|---|---|---|---|---|---|
|  | 300% | 500% | 700% |  |  |
| 20 min. at 10 lbs. steam per sq. in | 89 | 178 | 534 | 2080 | 970 |
| 25 min. at 10 lbs. steam per sq. in | 131 | 266 | 871 | 2285 | 890 |
| 30 min. at 10 lbs. steam per sq. in | 141 | 334 | 1155 | 2835 | 860 |
| 15 min. at 20 lbs. steam per sq. in | 159 | 396 | 1405 | 3260 | 885 |
| 30 min. at 20 lbs. steam per sq. in | 253 | 771 | 2758 | 4310 | 800 |
| 45 min. at 20 lbs. steam per sq. in | 323 | 1110 | 3788 | 4685 | 760 |
| 1 hr. at 20 lbs. steam per sq. in | 418 | 1510 | 4610 | 4610 | 700 |
| 1½ hrs. at 20 lbs. steam per sq. in | 418 | 1510 | 4610 | 4610 | 700 |
| 2 hrs. at 20 lbs. steam per sq. in | 441 | 1590 |  | 4455 | 675 |

Table V

| Time of cure | Modulus of elasticity in lbs./in.² at elongations of— | | | Tensile lbs./in.² at break | Ultimate elongation, percent |
| --- | --- | --- | --- | --- | --- |
| | 300% | 500% | 700% | | |
| 20 min. at 10 lbs. steam per sq. in | 128 | 255 | 835 | 2650 | 925 |
| 25 min. at 10 lbs. steam per sq. in | 148 | 322 | 1205 | 2905 | 875 |
| 30 min. at 10 lbs. steam per sq. in | 163 | 378 | 1450 | 3675 | 875 |
| 15 min. at 20 lbs. steam per sq. in | 156 | 400 | 1570 | 3190 | 860 |
| 30 min. at 20 lbs. steam per sq. in | 255 | 741 | 2830 | 4290 | 795 |
| 45 min. at 20 lbs. steam per sq. in | 326 | 1115 | 3945 | 4510 | 745 |
| 1 hr. at 20 lbs. steam per sq. in | 411 | 1525 | 4728 | 4775 | 705 |
| 1½ hrs. at 20 lbs. steam per sq. in | 411 | 1525 | 4728 | 4775 | 705 |
| 2 hrs. at 20 lbs. steam per sq. in | 459 | 1718 | | 4945 | 685 |

Table VI

| Time of cure | Modulus of elasticity in lbs./in.² at elongations of— | | | Tensile lbs./in.² at break | Ultimate elongation, percent |
| --- | --- | --- | --- | --- | --- |
| | 300% | 500% | 700% | | |
| 20 min. at 10 lbs. steam per sq. in | 76 | 133 | 346 | 1375 | 985 |
| 25 min. at 10 lbs. steam per sq. in | 92 | 180 | 512 | 2080 | 975 |
| 30 min. at 10 lbs. steam per sq. in | 104 | 226 | 721 | 2328 | 955 |
| 15 min. at 20 lbs. steam per sq. in | 110 | 228 | 754 | 2375 | 955 |
| 30 min. at 20 lbs. steam per sq. in | 174 | 396 | 1472 | 3315 | 870 |
| 45 min. at 20 lbs. steam per sq. in | 215 | 560 | 2015 | 3780 | 830 |
| 1 hr. at 20 lbs. steam per sq. in | 261 | 732 | 2655 | 3850 | 775 |
| 1½ hrs. at 20 lbs. steam per sq. in | 261 | 732 | 2655 | 3850 | 775 |
| 2 hrs. at 20 lbs. steam per sq. in | 279 | 776 | 2780 | 3990 | 770 |

A stock identical with that employed in the test given in Tables IV, V and VI with the exception that diphenylguanidine was substituted for the diphenylguanidine salts, on curing for 20 minutes at 10 lbs. steam pressure gave a tensile at break of 2780 lbs./ins.² and an ultimate elongation of 920%. The foregoing tests given in Tables IV, V and VI show that the preferred class of activating materials, when employed in the rubber stock described, retards or delays the curing action during the early stages of the vulcanization process but permits the accelerator to exert substantially its normal effect at full cure. In fact, the materials appear to first serve as retarders and later as activators—at least, the full activating effect of the materials is not produced during the early stages of the cure.

As a further example of the use of the preferred class of materials, a rubber stock was prepared comprising the following:

| | Parts |
| --- | --- |
| Pale crepe rubber | 100 |
| Sulfur | 2 |
| Zinc oxide | 5 |
| Whiting | 30 |
| Lithopone | 20 |
| Palm oil | 2 |
| Reaction product of 2 mols mercaptobenzothiazole and 1 mol phthalyl chloride | 0.6 |
| Diphenyl guanidine | 0.1 |
| Diphenyl guanidine phthalate | 0.399 |

The results of the tests upon the above rubber stock after curing are given in Table VII.

Table VII

| Time of cure | Modulus of elasticity in lbs./in.² at elongations of— | | | Tensile lbs./in.² at break | Ultimate elongation, percent |
| --- | --- | --- | --- | --- | --- |
| | 300% | 500% | 700% | | |
| 20 min. at 10 lbs. steam per sq. in.[1] | | | | | |
| 30 min. at 10 lbs. steam per sq. in | 290 | 890 | 2350 | 2955 | 790 |
| 10 min. at 20 lbs. steam per sq. in | 200 | 578 | 1550 | 2285 | 825 |
| 15 min. at 20 lbs. steam per sq. in | 301 | 925 | 2470 | 2865 | 750 |
| 30 min. at 20 lbs. steam per sq. in | 361 | 1140 | 2960 | 3500 | 760 |
| 45 min. at 20 lbs. steam per sq. in | 404 | 1250 | 3185 | 3595 | 735 |
| 60 min. at 20 lbs. steam per sq. in | 434 | 1280 | 3360 | 3515 | 720 |

[1] Did not cure.

It is readily apparent from the results set forth in Table VII that in the presence of one of the preferred class of materials, for example, diphenylguanidine phthalate, the vulcanization is retarded in the early period of the cures, but this retarding effect is not continued in the longer cures and the cures at the higher steam pressures.

As a further example of the use of the preferred class of materials, a rubber stock was prepared comprising the following:

| | Parts |
| --- | --- |
| Pale crepe rubber | 100 |
| Sulfur | 2 |
| Zinc oxide | 5 |
| Whiting | 30 |
| Lithopone | 20 |
| Palm oil | 2 |
| Reaction product of 2 mols mercaptobenzothiazole and 1 mol phthalyl chloride | 0.492 |
| Diphenylguanidine | 0.0818 |
| Diphenylguanidine phthalate | 0.3262 |

The results of the tests upon the above rubber stock after curing are given in Table VIII.

Table VIII

| Time of cure | Modulus of elasticity in lbs./in.² at elongations of— | | | Tensile lbs./in.² at break | Ultimate elongation, percent |
|---|---|---|---|---|---|
| | 300% | 500% | 700% | | |
| 20 min. at 10 lbs. steam per sq. in.[1] | | | | | |
| 30 min. at 10 lbs. steam per sq. in. | 177 | 496 | 1315 | 1850 | 805 |
| 10 min. at 20 lbs. steam per sq. in.[2] | | | | | |
| 15 min. at 20 lbs. steam per sq. in. | 215 | 665 | 1850 | 2450 | 800 |
| 30 min. at 20 lbs. steam per sq. in. | 306 | 960 | 2600 | 3360 | 780 |
| 45 min. at 20 lbs. steam per sq. in. | 374 | 1155 | 3050 | 3420 | 750 |
| 60 min. at 20 lbs. steam per sq. in. | 412 | 1265 | 3185 | 3340 | 730 |

[1] Did not cure.
[2] Not fit for test.

It is apparent from the results set forth in Table VIII that in this example also, as in previous examples cited, the presence of one of the preferred class of materials, for example, diphenylguanidine phthalate, retards the vulcanization process in the shorter timed cures, but the vulcanization of the compounded rubber stock wherein the preferred class of materials is incorporated is not retarded on the longer heating period and at the higher steam pressure cures.

As further examples of the use of the preferred class of materials, two rubber stocks, designated "A" and "B," were prepared and tested for comparison, stock "A" comprising diphenylguanidine as an activator and stock "B" comprising diphenylguanidine acetate in its stead as one of the preferred class of materials. The rubber stocks here referred to comprised the following ingredients:

| | Stock A | Stock B |
|---|---|---|
| | Parts | Parts |
| Smoked sheet rubber | 100 | 100 |
| Carbon black | 40 | 40 |
| Zinc oxide | 5 | 5 |
| Sulfur | 3 | 3 |
| A blended mineral and vegetable oil | 2 | 2 |
| Stearic acid | 1 | 1 |
| Acetaldehyde derivative of the reaction product of para-para-diamino diphenylmethane and mercaptobenzothiazole | 0.36 | 0.36 |
| Diphenylguanidine | 0.84 | |
| Diphenylguanidine acetate | | 0.84 |

The results of the tests upon the above rubber stocks after curing are given in Table IX.

Table IX

| Cure mins. | Steam pressure in lbs./in.² | Stock | Modulus of elasticity in lbs./in.² at elongations of— | | Tensile lbs./in.² at break | Ultimate elongation, percent |
|---|---|---|---|---|---|---|
| | | | 300% | 500% | | |
| 30 | 10 | A | 322 | 1108 | 1553 | 590 |
| | | B | 325 | 880 | 939 | 520 |
| 40 | 10 | A | 530 | 1568 | 2370 | 630 |
| | | B | 500 | 1298 | 1850 | 620 |
| 60 | 10 | A | 871 | 2280 | 3440 | 630 |
| | | B | 727 | 1845 | 2393 | 570 |
| 20 | 20 | A | 587 | 1698 | 2280 | 575 |
| | | B | 452 | 1250 | 1960 | 650 |
| 30 | 20 | A | 880 | 2270 | 3395 | 635 |
| | | B | 748 | 1970 | 2680 | 600 |
| 45 | 20 | A | 1195 | 2890 | 4490 | 670 |
| | | B | 1003 | 2480 | 3610 | 625 |
| 60 | 20 | A | 1488 | 3445 | 4930 | 625 |
| | | B | 1345 | 3020 | 4320 | 620 |
| 90 | 20 | A | 1650 | 3685 | 4860 | 610 |
| | | B | 1650 | 3605 | 4905 | 610 |
| 120 | 20 | A | 1890 | 4100 | 4860 | 570 |
| | | B | 1660 | 3725 | 4725 | 590 |

A comparison of the results given in Table IX gives further proof that the presence of one of the preferred class of materials, for example, diphenylguanidine acetate, retards the vulcanization in the shorter timed and lower steam pressure cures, but activates the vulcanization in the longer timed and higher steam pressure cures.

The results hereinbefore set forth show that a vulcanized rubber product of particularly high quality is obtained by employing the preferred substances in a rubber stock, of vulcanizing characteristics.

Other salts of guanidines than those hereinbefore set forth may be employed in the manner described. Thus, the phthalate, hydrochloride, acetate, and similar salts of di-ortho-tolyl-guanidine, dixylylguanidines, triphenylguanidines, and analogous compounds may be employed in the vulcanization of rubber in a manner analogous to that hereinbefore set forth.

This invention is not restricted to the use of the particular compounds given in the disclosure as examples, nor is it restricted to the use of the preferred class of compounds in the particular rubber mixes herein described. The invention is limited only by the claims attached hereto as part of the present specification.

This application is a division of my copending application Serial No. 490,814, filed October 23, 1930.

What is claimed is:

1. The process of vulcanizing rubber which comprises heating a mixture of rubber and sulfur in the presence of a mercapto-aryl-thiazole accelerator and in addition thereto a diaryl substituted guanidine salt of hydrochloric acid.

2. The process of vulcanizing rubber which comprises heating a mixture of rubber and sulfur in the presence of a mercapto-benzo-thiazole accelerator and in addition thereto diphenyl guanidine hydrochloride.

3. The vulcanized rubber product produced by heating rubber and sulfur in the presence of a mercapto-aryl-thiazole accelerator and in addition thereto a diaryl substituted guanidine salt of hydrochloric acid.

4. The vulcanized rubber product produced by heating rubber and sulfur in the presence of a mercapto-benzo-thiazole accelerator and in addition thereto diphenyl guanidine hydrochloride.

ROBERT L. SIBLEY.